US012338020B1

(12) United States Patent
Liu

(10) Patent No.: US 12,338,020 B1

(45) Date of Patent: Jun. 24, 2025

(54) VACUUM AIR EXTRACTION DEVICE WITH HIGH PRACTICALITY AND RELIABILITY

(71) Applicant: Haoyu Liu, Puning (CN)

(72) Inventor: Haoyu Liu, Puning (CN)

( * ) Notice: Subject to any disclaimer, the term of this patent is extended or adjusted under 35 U.S.C. 154(b) by 0 days.

(21) Appl. No.: 18/741,362

(22) Filed: Jun. 12, 2024

(30) Foreign Application Priority Data

May 26, 2024 (CN) ......................... 202410657712.4

(51) Int. Cl.

*B65B 31/04* (2006.01)

*B65D 81/20* (2006.01)

*B67B 3/24* (2006.01)

(52) U.S. Cl.

CPC ........ *B65B 31/046* (2013.01); *B65D 81/2038* (2013.01); *B67B 3/24* (2013.01)

(58) Field of Classification Search

CPC ...... B65B 31/046; B65D 81/2038; B67B 3/24

USPC .............................................................. 53/78

See application file for complete search history.

(56) References Cited

U.S. PATENT DOCUMENTS

| | | | | |
|---|---|---|---|---|
| 2011/0126939 | A1* | 6/2011 | Luis | B65B 31/047 141/98 |
| 2021/0276750 | A1* | 9/2021 | Salvaro | F28D 7/0008 |
| 2024/0092513 | A1* | 3/2024 | Yao | B65B 31/028 |
| 2024/0262552 | A1* | 8/2024 | Batavia | B65D 81/2015 |

FOREIGN PATENT DOCUMENTS

| | | | | |
|---|---|---|---|---|
| CN | 210635076 U | | 5/2020 | |
| CN | 213800944 U | | 7/2021 | |
| CN | 215619465 U | | 1/2022 | |
| CN | 110014449 B | * | 3/2024 | B25J 15/0633 |

* cited by examiner

*Primary Examiner* — Anna K Kinsaul

*Assistant Examiner* — Mary C Hibbert-Copeland

(74) *Attorney, Agent, or Firm* — George D. Morgan

(57) ABSTRACT

The present invention provides a vacuum air extraction device with high practicality and reliability. The vacuum air extraction device with high practicality and reliability includes an air extraction host machine and a vacuum sucker in matching connection to a lower part of the air extraction host machine, where a control circuit board, a vacuum air pump and a decompression valve are arranged in the air extraction host machine; an annular groove body is formed in one end connected to the air extraction host machine, of the vacuum sucker; a spongy body for filtering air is arranged in the annular groove body; air extracted through the air extraction host machine passes through the air circulation channel to enter the annular groove body, is filtered at the spongy body, and then flows into the vacuum air pump.

9 Claims, 7 Drawing Sheets

VACUUM AIR EXTRACTION DEVICE WITH HIGH PRACTICALITY AND RELIABILITY

CROSS-REFERENCE TO RELATED APPLICATIONS

The application claims priority to Chinese patent application No. 2024106577124, filed on May 26, 2024, the entire contents of which are incorporated herein by reference.

TECHNICAL FIELD

The present invention relates to the technical field of vacuum extraction equipment, and particularly to a vacuum air extraction device with high practicality and reliability, wide in application range.

BACKGROUND

With continuous improvement of people's quality of life, the demand for food preservation is also increasing. Generally, food ingredients can be stored for a relatively long time in a vacuum environment. Based on this, vacuum extraction equipment for bottle bodies and bag bodies has emerged on the market.

A Mason bottle is commonly used as a sealed container for storing food in daily life. Due to its fresh appearance, rich size and strong plasticity, the Mason bottle has also given rise to many new uses. A bottle and a cap of the Mason bottle are separate, and the cap can be one piece, two piece, etc. Currently, some Mason bottles are tightened with threaded caps for sealing. Although sealing effects can be achieved, air inside the bottles cannot be discharged, which is not conducive to long-term storage of food inside the bottles. Or vacuum extraction is achieved in a manner of using manual pumps or hand-held vacuum pumps combined with seal caps, or achieved in a manner of disassembling some parts of the product, which is inconvenient to operate. To solve the above related problems, automatic vacuum extraction products have appeared on the market, but there are still some problems, such as poor drain performance, liability to causing damage to internal components of the equipment, and poor universality, affecting practicality of products.

The utility model patent with application number CN202320685846.8 and patent name "AUTOMATIC VACUUM SEALER" specifically discloses an automatic vacuum sealer, including an upper shell, a lower shell, a circuit board, a vacuum pump, and a battery, where the upper shell and the lower shell are interlocked and fixed together, and the circuit board, the vacuum pump, and the battery are mounted in a mounting chamber formed between the upper shell and the lower shell; the vacuum pump and the battery are both connected to the circuit board, and buttons for controlling a working state of the vacuum pump are further arranged on the circuit board; an air extraction opening of the vacuum pump communicates with an air extraction hole; and two annular sealing soft adhesives, one large annular sealing soft adhesive and one small annular sealing soft adhesive, are arranged at a bottom of the lower shell. The cap is sealed at a bottle mouth of the bottle by vacuum extraction; universal seal of bottles having two commonly used sizes, namely wide-mouth bottles and standard-mouth bottles, is achieved through two layers of soft adhesive structure inside, and universal seal of bottles with bottle mouths of different diameters can be achieved without disassembly and repeated assembly of products; and the soft adhesive structure can also match with external suction accessories, a plug is inserted into the seal cap to meet other vacuum extraction needs, such as vacuum bags, vacuum boxes, and vacuum jars, which are practical and conducive to promotion and application.

The existing technical features mentioned above have the aforementioned related problems, which restrict better promotion and application of the products.

SUMMARY

A problem in a the prior art to be resolved in the present application lies in that:

- although vacuum extraction equipment in the prior art has achieved a certain degree of automation, there are still some problems, such as poor drain performance, liability to causing damage to internal components of the equipment, and poor universality, affecting practicality of products.

In order to solve the technical problems, the present invention adopts the following solution.

The present invention provides a vacuum air extraction device with high practicality and reliability, including an air extraction host machine and a vacuum sucker in matching connection to a lower part of the air extraction host machine; a control circuit board, a vacuum air pump and a decompression valve are arranged in the air extraction host machine, and the vacuum air pump, the decompression valve and the control circuit board are electrically connected;

- the vacuum sucker is hollow inside to form an air circulation channel for air extraction; a plastic air extraction connector with high adaptability is connected to the other end of the air extraction host machine relative to the vacuum sucker;
- an annular groove body is formed in one end connected to the air extraction host machine, of the vacuum sucker; a spongy body for filtering air is arranged in the annular groove body; air extracted through the air extraction host machine passes through the air circulation channel to enter the annular groove body, is filtered at the spongy body, and then flows into the vacuum air pump;
- the vacuum air extraction device with high practicality and reliability further includes an air extraction hole and a drain hole which are formed in a lower side of the air extraction host machine; the vacuum air pump communicates with the air extraction hole through a first pipeline, and communicates with the drain hole through a second pipeline; and condensed water generated during an air extraction process is drained out of the air extraction host machine.

Preferably, an inner convex part is integrally formed at one end towards the air extraction connector, on an inner side of the vacuum sucker; the inner convex part and an inner wall of the vacuum sucker jointly form a water storage tank body for storing a certain amount of condensed water;

- a blocking block for blocking air from flowing upwards quickly is further arranged on an upper side of an inner convex part;
- a communicating hole communicating with the annular groove body is formed in the air circulation channel of the vacuum sucker; and air flows into the annular groove body through the communicating hole from the air circulation channel.

Preferably, the other end of the vacuum sucker is connected to a vacuum bottle cap assembly, relative to the air extraction host machine, the vacuum bottle cap assembly includes a cap body in matching connection to an outer bottle body, a cap body panel located on an inner side of the cap body, and a silicone ring sleeved outside the cap body panel;

the vacuum bottle cap assembly further includes a vacuum extraction connector located at a middle position of the cap body panel; and an air extraction connector is in matching connection to a vacuum extraction connector.

Preferably, the air extraction host machine includes a host machine shell and a host machine cover plate matching with an upper part of the host machine shell or integrally formed at the upper part of the host machine shell;

the air extraction host machine further includes a control panel arranged on the host machine cover plate;

a connecting groove in matching connection to the vacuum sucker is arranged at one end towards the vacuum sucker, of the host machine shell; and a threaded connection part or a snap-fit connection part is arranged at a periphery of the annular groove body of the vacuum sucker, and is embedded into the connecting groove to achieve connection to the air extraction host machine.

Preferably, an air pressure sensor for sensing air pressure is further arranged in the air extraction host machine;

a first gas column communicating with a decompression valve through a pipeline, a second gas column communicating with the air pressure sensor through a pipeline, a third gas column communicating with a vacuum air pump through the first pipeline, and a fourth gas column communicating with the vacuum air pump through the second pipeline are arranged in the host machine shell;

the third gas column and the fourth gas column correspond to the air extraction hole and the drain hole respectively; and a plurality of support columns used for allowing the control circuit board, the vacuum air pump, the decompression valve and the air pressure sensor to be mounted are further integrally formed on an inner side of the host machine shell.

Preferably, an LED lamp panel is further arranged on an inner side towards one end of the vacuum sucker, in the air extraction host machine;

a lower part of the air extraction host machine is arranged in a transparent or semi-transparent light-transmitting structure;

the vacuum air extraction device with high practicality and reliability further includes a rechargeable battery assembly arranged in the air extraction host machine; and a charging socket is formed in the air extraction host machine.

Preferably, a seal ring is further attached on an inner side of the connecting groove;

a plurality of spacing holes are formed in the seal ring in a surrounding manner; and spacing columns corresponding to the spacing holes are integrally and convexly formed in the connecting groove.

Preferably, a time disk is further arranged at an upper part of the cap body; a cap body groove having a shape matching with the shape of the time dial and used for allowing the time disk to be embedded is formed in the cap body; and an annular convex ring corresponding to the air extraction connector and an annular convex surround matching with an inner wall of the cap body groove for spacing are arranged at a middle position of an upper part of the cap body panel.

Preferably, the vacuum sucker is in snap-in connection to the air extraction connector; and a socket capable of being inserted in the air extraction connector in a surrounding manner is integrally formed at a lower part of the vacuum sucker.

Preferably, the inner convex part is located at a middle position of an inner side of the vacuum sucker.

A technical effect achieved in the present application by resolving the technical problem is as follows:

compared with the prior art, the vacuum air extraction device with high practicality and reliability of the present invention is provided with the air extraction host machine 15 and the vacuum sucker 13 in matching connection to the lower part of the air extraction host machine 15, where the control circuit board 155, the vacuum air pump 156 and the decompression valve 159 are arranged in the air extraction host machine 15, and the vacuum air pump 156, the decompression valve 159 and the control circuit board 155 are electrically connected; the vacuum sucker 13 is hollow inside to form an air circulation channel 133 for extraction; a plastic air extraction connector 131 with high adaptability is connected to the other end of the air extraction host machine 15 relative to the vacuum sucker 13; an annular groove body 134 is formed in one end connected to the air extraction host machine 15, of the vacuum sucker 13; a spongy body 14 for filtering air is arranged in the annular groove body 134; and air extracted through the air extraction host machine 15 passes through the air circulation channel 133 to enter the annular groove body 134, is filtered at the spongy body 14, and then flows into a position of the vacuum air pump 156. The vacuum air extraction device with high practicality and reliability further includes an air extraction hole 1538 and a drain hole 1539 which are formed in a lower side of the air extraction host machine 15; the vacuum air pump 156 communicates with the air extraction hole 1538 through a first pipeline, and communicates with the drain hole 1539 through a second pipeline; and condensed water generated during an air extraction process is drained out of the air extraction host machine 15. In practical applications, the setting of the drain hole 1539 can be effectively utilized to avoid accumulation of the condensed water inside a machine body, impurity filtration treatment can be effectively performed on air, and reliability and performance of the machine body are improved.

Figure 1:
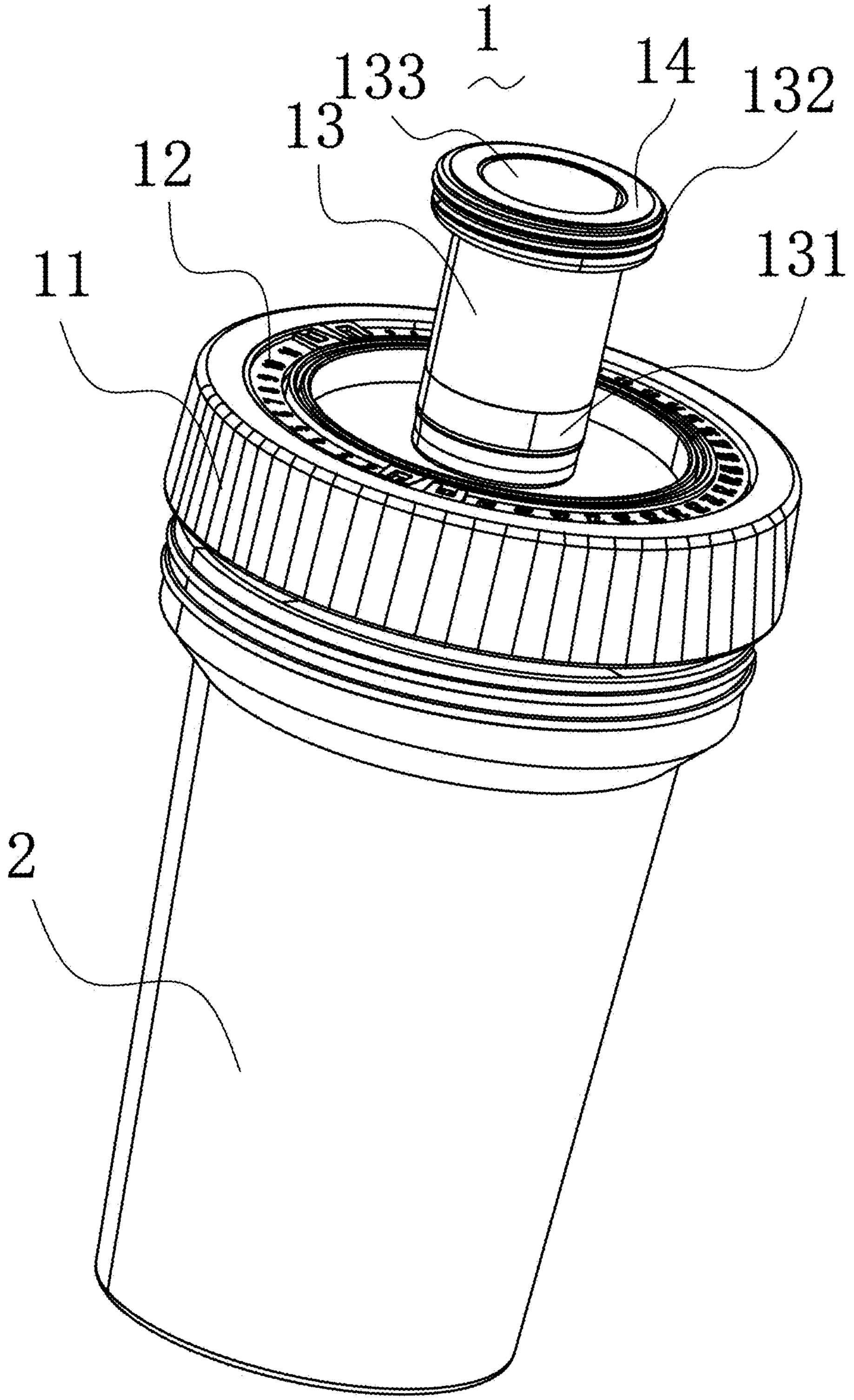
FIG. 1 shows a schematic structural diagram of a vacuum air extraction device with high practicality and reliability in an application state, of the present invention.

vacuum bottle cap assembly 11; cap body 111; cap body groove 112; time dial 12; vacuum sucker 13; air extraction connector 131; air circulation channel 133; annular groove body 134; communicating hole 135; water storage tank body 136; inner convex part 137; blocking block 138; spongy body 14; air extraction host machine 15; host machine cover plate 151; control panel 152; host machine shell 153; first gas column 1531; second gas column 1532; third gas column 1533; fourth gas column 1534; connecting groove 1536; spacing column 1537; air extraction hole 1538; drain hole 1539; control circuit board 155; vacuum air pump 156; rechargeable battery assembly 157; decompression valve 159.

DETAILED DESCRIPTION OF THE EMBODIMENTS

To make the purposes, technical solutions, and advantages of the present invention clearer, the following further describes the present invention in detail with reference to the accompanying drawings and embodiments. It should be understood that, specific embodiments described herein are merely used to explain the present invention but not to limit the present invention.

Figure 2:
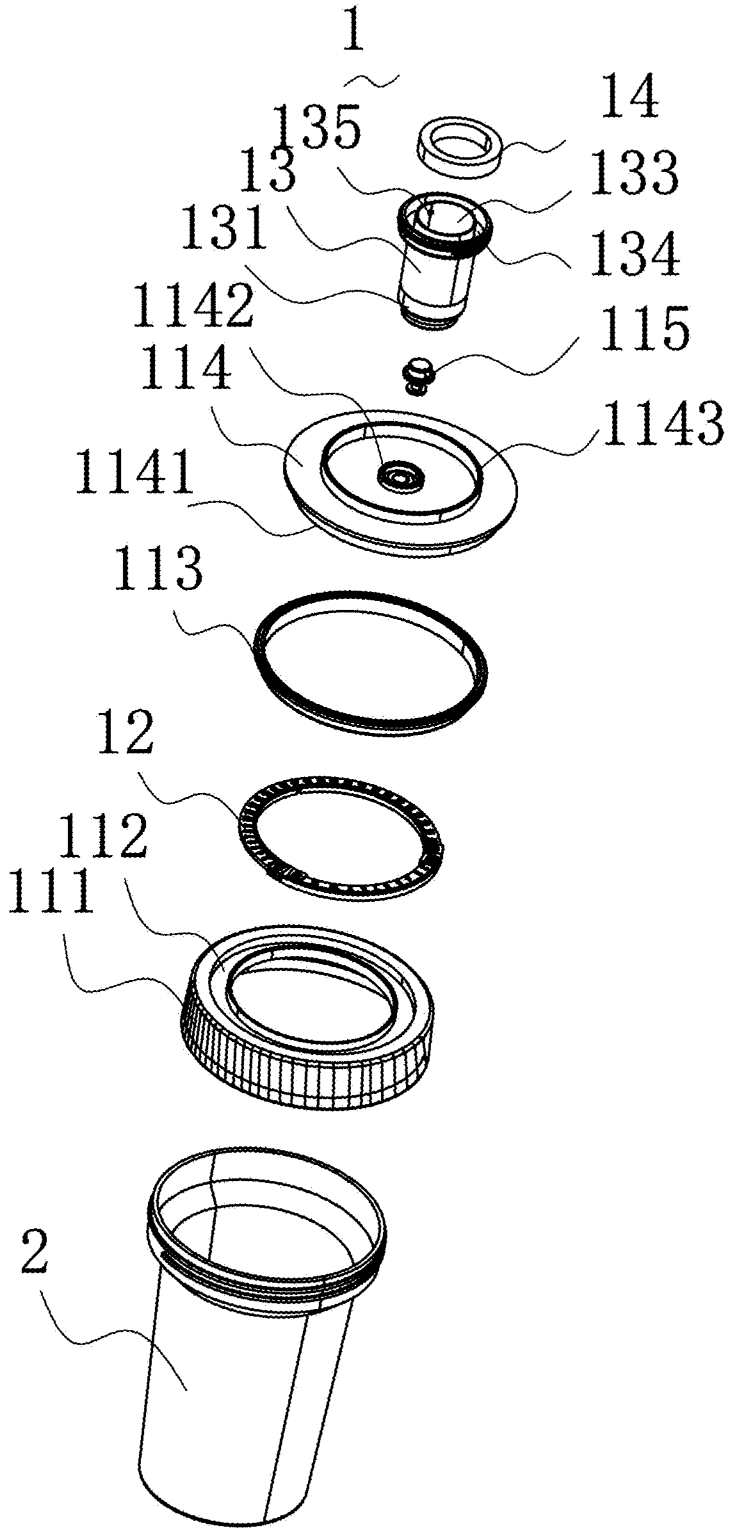
FIG. 2 shows a schematic structural diagram of a vacuum air extraction device with high practicality and reliability in an exploded state, of the present invention.
Figure 3:
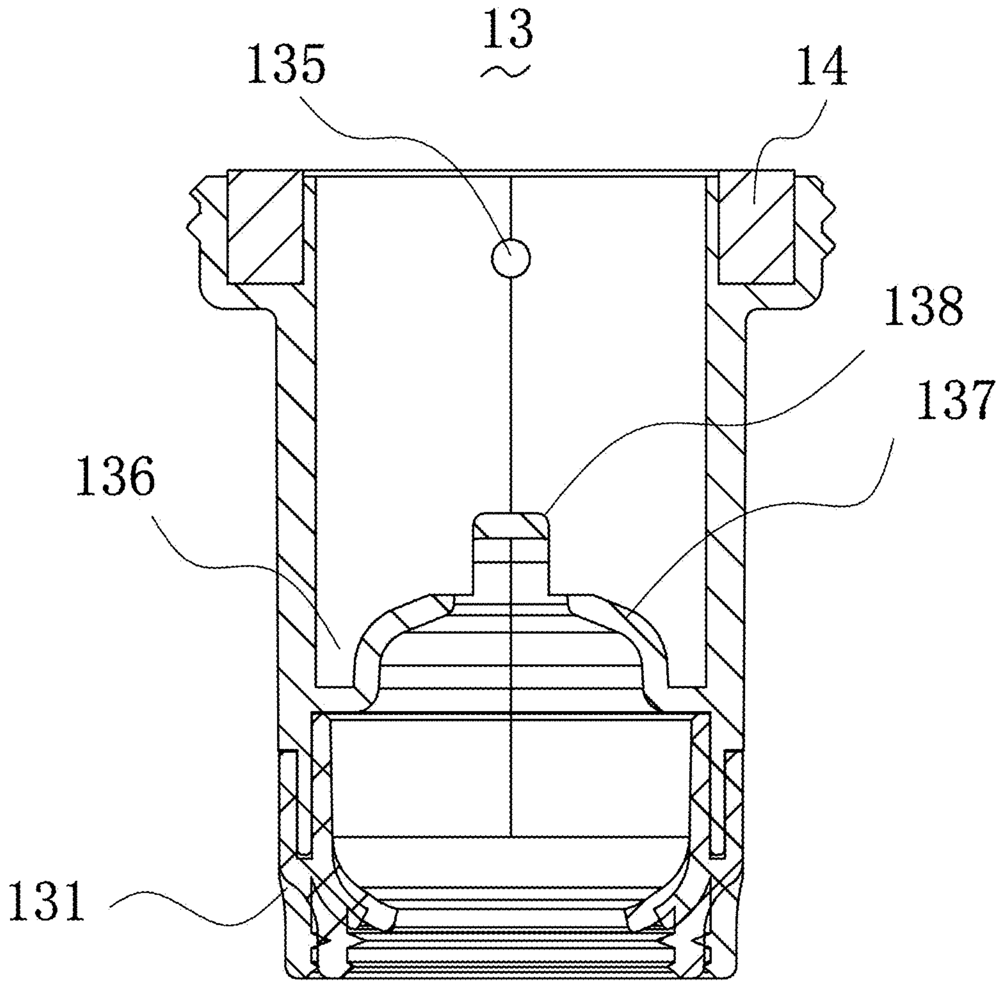
FIG. 3 shows a schematic structural diagram of a vacuum sucker in a section state of a vacuum air extraction device with high practicality and reliability of the present invention.
Figure 4:
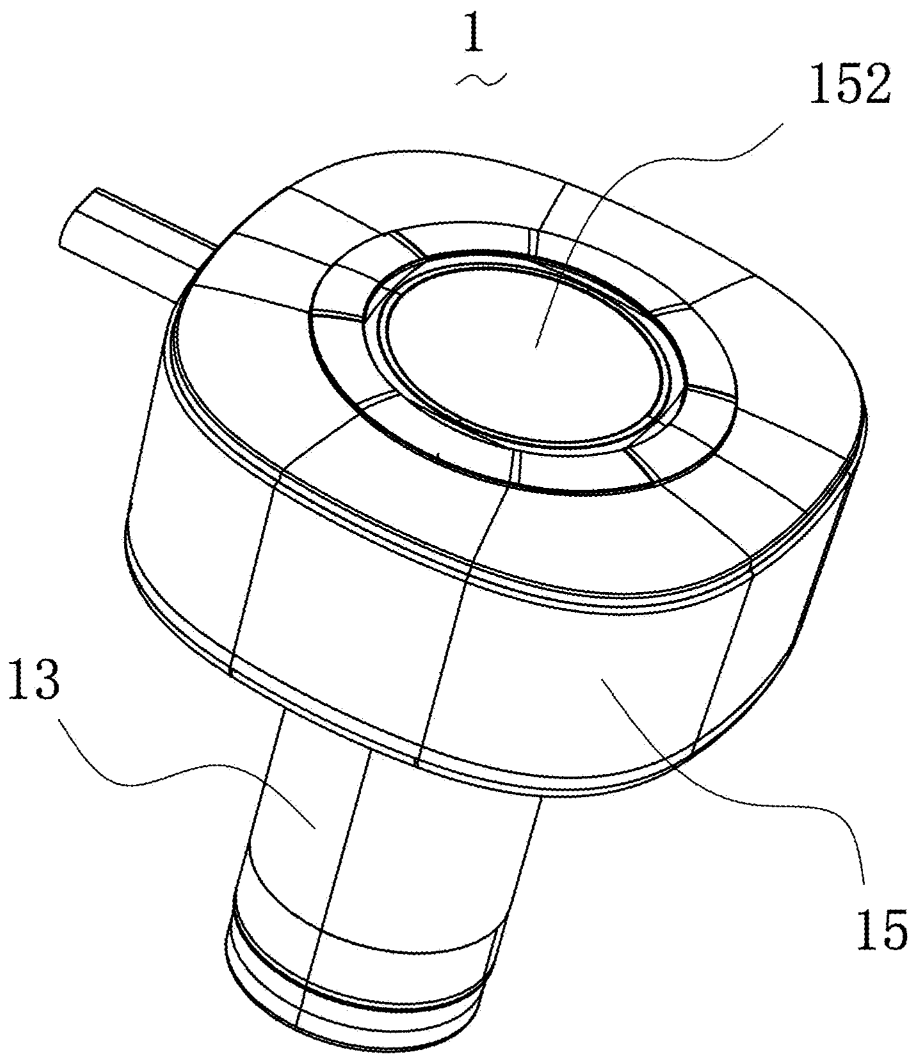
FIG. 4 shows a schematic structural diagram of a vacuum air extraction device with high practicality and reliability in a perspective state, of the present invention.
Figure 5:
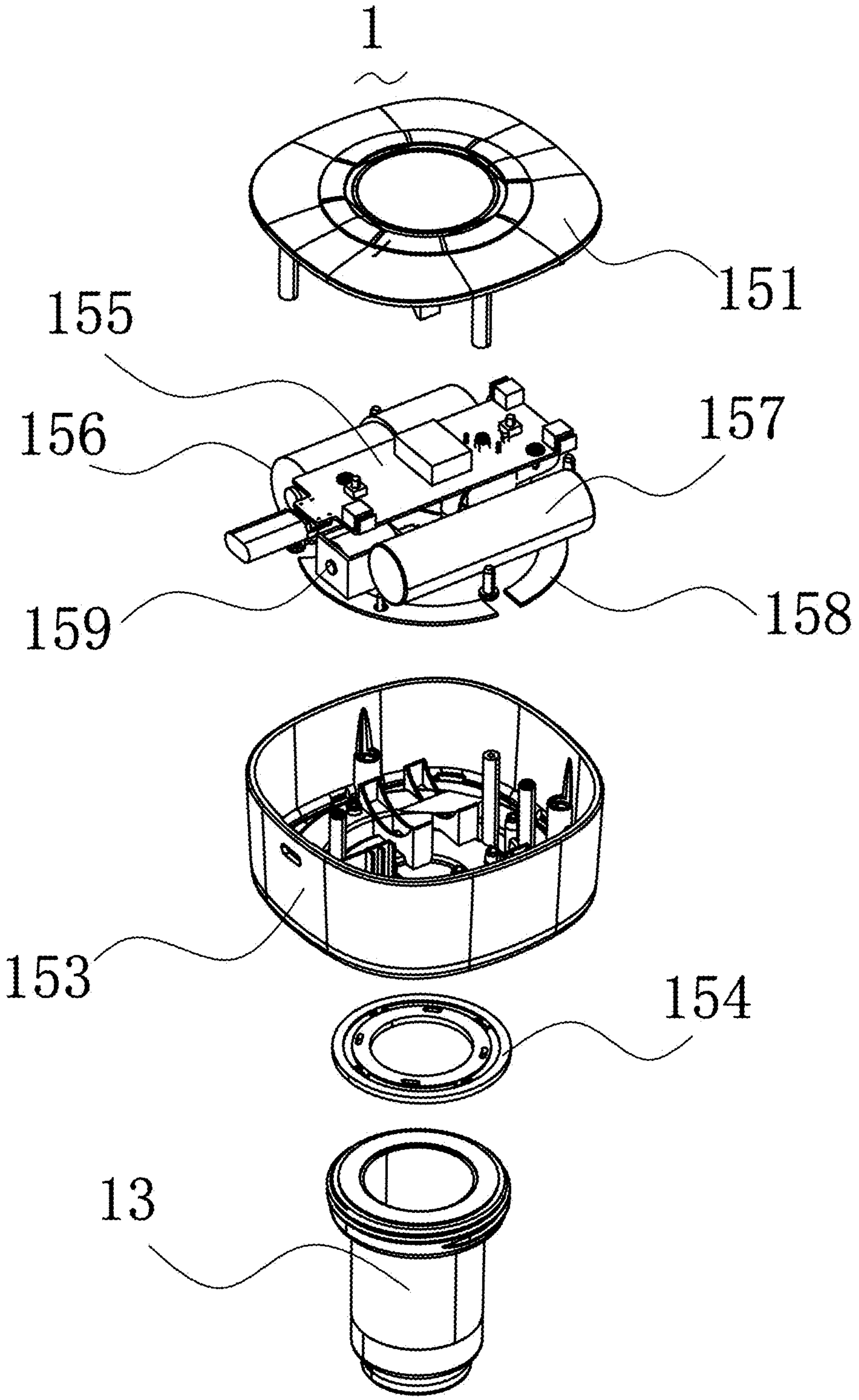
FIG. 5 shows a schematic structural diagram of a vacuum air extraction device with high practicality and reliability in another exploded state, of the present invention.
Figure 6:
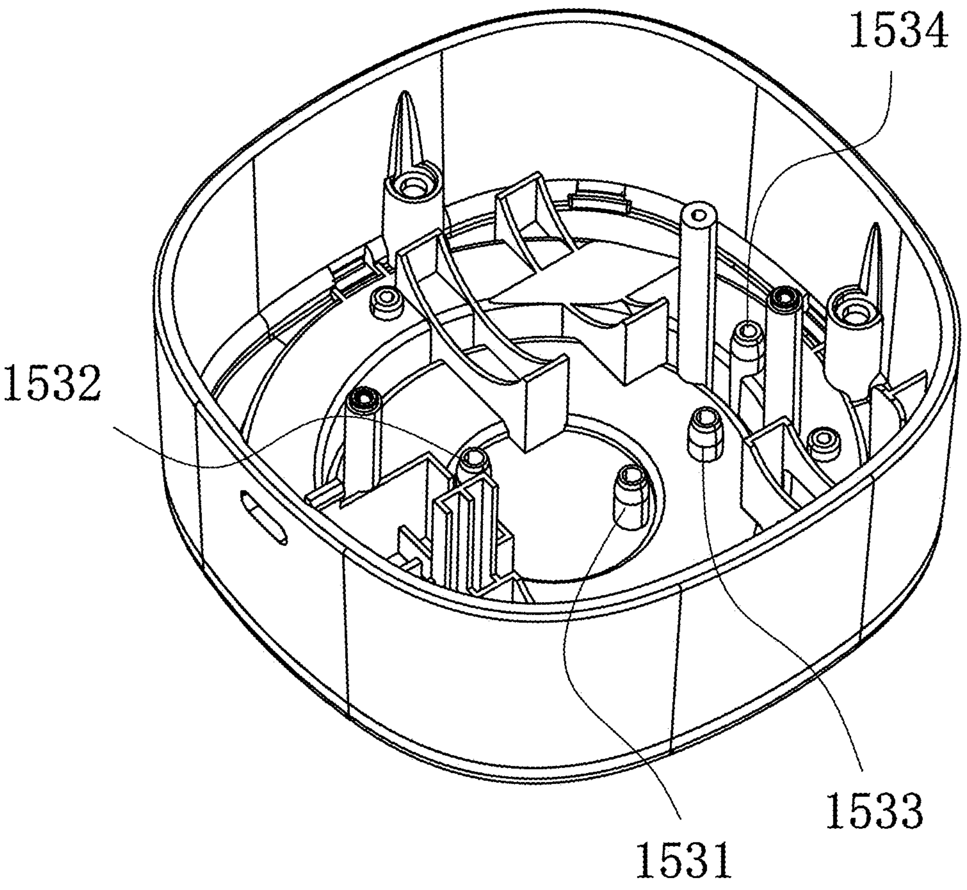
FIG. 6 and FIG. 7 show a schematic structural diagram of a host machine shell in a perspective state of a vacuum air extraction device with high practicality and reliability, of the present invention.
Figure 7:
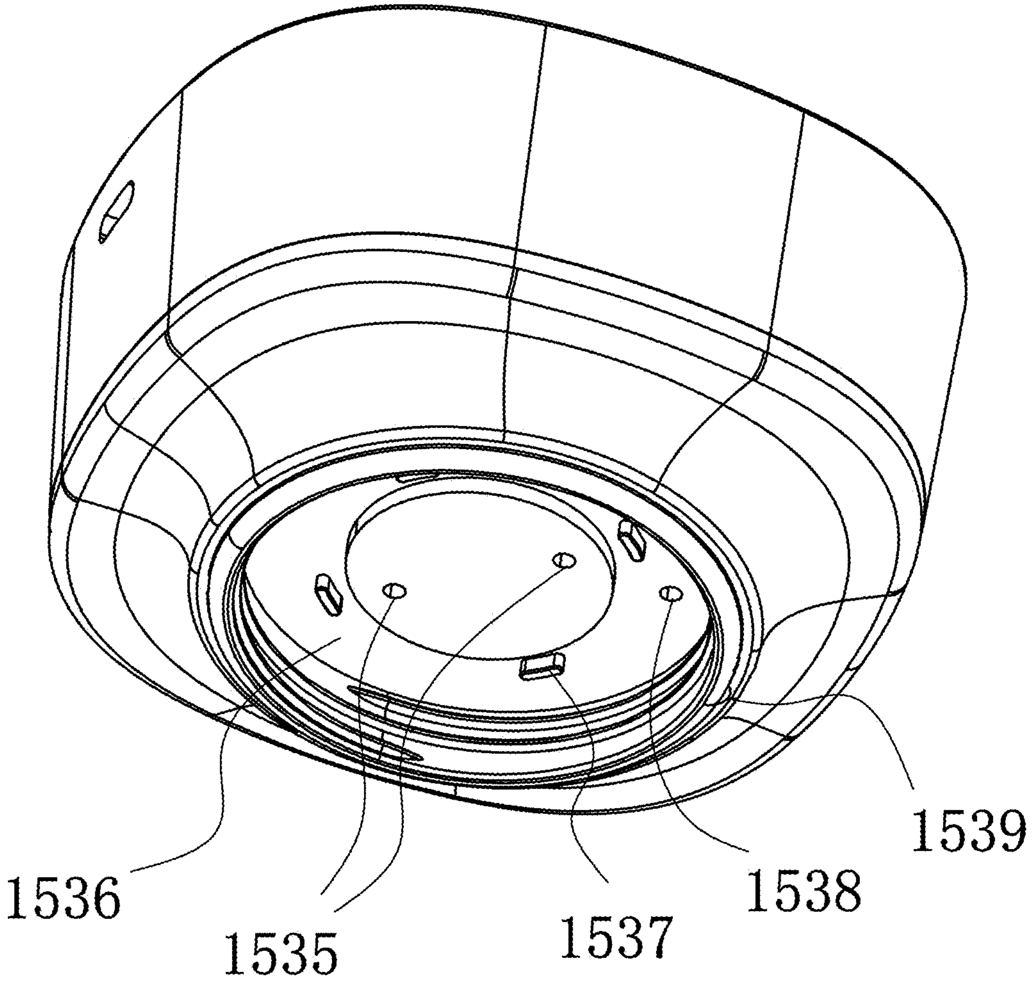

Referring to FIG. 1 to FIG. 7, a vacuum air extraction device 1 with high practicality and reliability of the present invention, includes an air extraction host machine 15 and a vacuum sucker 13 in matching connection to a lower part of the air extraction host machine 15, where a control circuit board 155, a vacuum air pump 156 and a decompression valve 159 are arranged in the air extraction host machine 15, and the vacuum air pump 156, the decompression valve 159 and the control circuit board 155 are electrically connected;

the vacuum sucker 13 is hollow inside to form an air circulation channel 133 for extraction; a plastic air extraction connector 131 with high adaptability is connected to the other end of the air extraction host machine 15 relative to the vacuum sucker 13;

an annular groove body 134 is formed in one end connected to the air extraction host machine 15, of the vacuum sucker 13; a spongy body 14 for filtering air is arranged in the annular groove body 134; and air extracted through the air extraction host machine 15 passes through the air circulation channel 133 to enter the annular groove body 134, is filtered at the spongy body 14, and then flows into a position of the vacuum air pump 156.

The vacuum air extraction device with high practicality and reliability further includes an air extraction hole 1538 and a drain hole 1539 which are formed in a lower side of the air extraction host machine 15; the vacuum air pump 156 communicates with the air extraction hole 1538 through a first pipeline, and communicates with the drain hole 1539 through a second pipeline; and condensed water generated during an air extraction process is drained out of the air extraction host machine 15.

The decompression valve 159 is connected to the vacuum air pump 156 through a food-grade silicone tube.

The vacuum air extraction device with high practicality and reliability of the present application is simultaneously provided with the air extraction host machine 15 and the vacuum sucker 13 in matching connection to the lower part of the air extraction host machine 15, where the control circuit board 155, the vacuum air pump 156 and the decompression valve 159 are arranged in the air extraction host machine 15, and the vacuum air pump 156, the decompression valve 159 and the control circuit board 155 are electrically connected; the vacuum sucker 13 is hollow inside to form an air circulation channel 133 for extraction; a plastic air extraction connector 131 with high adaptability is connected to the other end of the air extraction host machine 15 relative to the vacuum sucker 13; the annular groove body 134 is formed in one end connected to the air extraction host machine 15, of the vacuum sucker 13; the spongy body 14 for filtering air is arranged in the annular groove body 134; and air extracted through the air extraction host machine 15 passes through the air circulation channel 133 to enter the annular groove body 134, is filtered at the spongy body 14, and then flows into a position of the vacuum air pump 156. The vacuum air extraction device with high practicality and reliability further includes an air extraction hole 1538 and a drain hole 1539 which are formed in a lower side of the air extraction host machine 15; the vacuum air pump 156 communicates with the air extraction hole 1538 through a first pipeline, and communicates with the drain hole 1539 through a second pipeline; and condensed water generated during an air extraction process is drained out of the air extraction host machine 15. In practical applications, the setting of the drain hole 1539 can be effectively utilized to avoid accumulation of the condensed water inside a machine body, impurity filtration treatment can be effectively performed on air, and reliability and performance of the machine body are improved.

In specific application fields, the vacuum air extractor with high practicality and reliability of the present application can be suitable for products of vacuum lunch boxes, storage jars (Mason jars), wine bottle corks, vacuum sealer bags, etc.

In some other embodiments, an inner convex part 137 is integrally formed at one end towards the air extraction connector 131, on an inner side of the vacuum sucker 13; the inner convex part 137 and an inner wall of the vacuum sucker 13 jointly form a water storage tank body 136 for storing a certain amount of the condensed water;

a blocking block 138 for blocking air from flowing upwards quickly is further arranged on an upper side of the inner convex part 137;

a communicating hole 135 communicating with the annular groove body 134 is formed in the air circulation channel 133 of the vacuum sucker 13; and air flows into the annular groove body 134 through the communicating hole 135 from the air circulation channel 133.

The other end of the vacuum sucker 13 is connected to a vacuum bottle cap assembly 11, relative to the air extraction host machine 15; the vacuum bottle cap assembly 11 includes a cap body 111 in matching connection to an outer bottle body 2, a cap body panel 114 located on an inner side of the cap body 111, and a silicone ring 113 sleeved outside the cap body panel 114;

the vacuum bottle cap assembly further includes a vacuum extraction connector 115 located at a middle position of the cap body panel 114; and an air extraction connector 131 is in matching connection to the vacuum extraction connector 115.

The air extraction host machine 15 includes a host machine shell 153 and a host machine cover plate 151 matching with an upper part of the host machine shell 153 or integrally formed at the upper part of the host machine shell 153; and the air extraction host machine further includes a control panel 152 arranged on the host machine cover plate 151.

In actual design, control buttons can also be arranged on an upper part of the host machine for functional control.

A connecting groove 1536 in matching connection to the vacuum sucker 13 is formed in one end towards the vacuum sucker 13, of the host machine shell 153; and a threaded connection part 134 or a snap-fit connection part is arranged at a periphery of the annular groove body 134 of the vacuum sucker 13, and is embedded into the connecting groove 1536 to achieve connection to the air extraction host machine 15.

An air pressure sensor for sensing air pressure is further arranged in the air extraction host machine 15;

a first gas column 1531 communicating with a decompression valve 159 through a pipeline, a second gas column 1532 communicating with the air pressure sensor through a pipeline, a third gas column 1533 communicating with the vacuum air pump 156 through the first pipeline, and a fourth gas column 1534 communicating with the vacuum air pump 156 through the second pipeline are arranged in the host machine shell 153;

the third gas column 1533 and the fourth gas column 1534 correspond to the air extraction hole 1538 and the drain hole 1539 respectively; and a plurality of support columns used for allowing the control circuit board 155, the vacuum air pump 156, the decompression valve 159 and the air pressure sensor to be mounted are further integrally formed on an inner side of the host machine shell 153.

An LED lamp panel 158 is further arranged on an inner side towards one end of the vacuum sucker 13, in the air extraction host machine 15;

a lower part of the air extraction host machine 15 is arranged in a transparent or semi-transparent light-transmitting structure; and the LED lamp panel 158 can be covered with a semi-transparent plastic member.

The vacuum air extraction device with high practicality and reliability further includes a rechargeable battery assembly 157 arranged in the air extraction host machine 15; and a charging socket is formed in the air extraction host machine 15.

A seal ring 154 is further attached on an inner side of the connecting groove 1536;

a plurality of spacing holes are formed in the seal ring 154 in a surrounding manner; and spacing columns 1537 corresponding to the spacing holes are integrally and convexly formed in the connecting groove 1536.

A time dial 12 is further arranged at an upper part of the cap body 111, which has functions such as date tracking, expiration reminder, or timer; a cap body groove 112 having a shape matching with the shape of the time dial 12 and used for allowing the time dial 12 to be embedded is formed in the cap body 111; and an annular convex ring 1142 corresponding to the air extraction connector 131 and an annular convex surround 1143 matching with an inner wall of the cap body groove 112 for spacing are arranged at a middle position of an upper part of the cap body panel 114.

The vacuum sucker 13 is in snap-in connection to the air extraction connector 131; and a socket capable of being inserted in the air extraction connector 131 in a surrounding manner is integrally formed at a lower part of the vacuum sucker 13.

The inner convex part 137 is located at a middle position of an inner side of the vacuum sucker 13.

A technical effect achieved in the present application by resolving the technical problem is as follows:

compared with the prior art, the vacuum air extraction device 1 with high practicality and reliability of the present invention is provided with the air extraction host machine 15 and the vacuum sucker 13 in matching connection to the lower part of the air extraction host machine 15, where the control circuit board 155, the vacuum air pump 156 and the decompression valve 159 are arranged in the air extraction host machine 15, and the vacuum air pump 156, the decompression valve 159 and the control circuit board 155 are electrically connected; the vacuum sucker 13 is hollow inside to form an air circulation channel 133 for extraction; a plastic air extraction connector 131 with high adaptability is connected to the other end of the air extraction host machine 15 relative to the vacuum sucker 13; the annular groove body 134 is formed in one end connected to the air extraction host machine 15, of the vacuum sucker 13; the spongy body 14 for filtering air is arranged in the annular groove body 134; and air extracted through the air extraction host machine 15 passes through the air circulation channel 133 to enter the annular groove body 134, is filtered at the spongy body 14, and then flows into a position of the vacuum air pump 156. The vacuum air extraction device with high practicality and reliability further includes the air extraction hole 1538 and the drain hole 1539 which are formed in a lower side of the air extraction host machine 15; the vacuum air pump 156 communicates with the air extraction hole 1538 through the first pipeline, and communicates with the drain hole 1539 through the second pipeline; and condensed water generated during an air extraction process is drained out of the air extraction host machine 15. In practical applications, the setting of the drain hole 1539 can be effectively utilized to avoid accumulation of the condensed water inside the machine body, impurity filtration treatment can be effectively performed on air, and reliability and performance of the machine body are improved.

The foregoing implementations of the present invention do not limit the protection scope of the present invention. Any modification, equivalent replacement, improvements, etc. made without departing from the spirit and principle of the present invention shall all fall within the protection scope of the claims of the present invention.

What is claimed is:

1. A vacuum air extraction device with high practicality and reliability, comprising an air extraction host machine and a vacuum sucker in matching connection to a lower part of the air extraction host machine; a control circuit board, a vacuum air pump and a decompression valve are arranged in the air extraction host machine, and the vacuum air pump, the decompression valve and the control circuit board are electrically connected, wherein the vacuum sucker is hollow inside to form an air circulation channel for air extraction; a plastic air extraction connector with high adaptability is connected to the other end of the air extraction host machine relative to the vacuum sucker;

an annular groove body is formed in one end connected to the air extraction host machine, of the vacuum sucker; a spongy body for filtering air is arranged in the annular groove body; air extracted through the air extraction host machine passes through the air circulation channel to enter the annular groove body, is filtered at the spongy body, and then flows into the vacuum air pump;

the vacuum air extraction device with high practicality and reliability further comprises an air extraction hole and a drain hole which are formed in a lower side of the air extraction host machine; the vacuum air pump communicates with the air extraction hole through a first pipeline, and communicates with the drain hole through a second pipeline; and condensed water generated during an air extraction process is drained out of the air extraction host machine;

an inner convex part is integrally formed at one end towards the air extraction connector, on an inner side of the vacuum sucker; the inner convex part and an inner wall of the vacuum sucker jointly form a water storage tank body for storing a certain amount of condensed water;

a blocking block for blocking air from flowing upwards quickly is further arranged on an upper side of an inner convex part; and a communicating hole communicating with the annular groove body is formed in the air circulation channel of the vacuum sucker; and air flows into the annular groove body through the communicating hole from the air circulation channel.

2. The vacuum air extraction device with high practicality and reliability according to claim 1, wherein the other end of the vacuum sucker is connected to a vacuum bottle cap assembly, relative to the air extraction host machine; the vacuum bottle cap assembly comprises a cap body in matching connection to an outer bottle body, a cap body panel located on an inner side of the cap body, and a silicone ring sleeved outside the cap body panel;

the vacuum bottle cap assembly further comprises a vacuum extraction connector located at a middle position of the cap body panel; and an air extraction connector is in matching connection to a vacuum extraction connector.

3. The vacuum air extraction device with high practicality and reliability according to claim 2, wherein a time dial is further arranged at an upper part of the cap body; a cap body groove having a shape matching with the shape of the time dial and used for allowing the time dial to be embedded is formed in the cap body; and an annular convex ring corresponding to the air extraction connector and an annular convex surround matching with an inner wall of the cap body groove for spacing are arranged at a middle position of an upper part of the cap body panel.

4. The vacuum air extraction device with high practicality and reliability according to claim 1, wherein the air extraction host machine comprises a host machine shell and a host machine cover plate matching with an upper part of the host machine shell or integrally formed at the upper part of the host machine shell;

the air extraction host machine further comprises a control panel arranged on the host machine cover plate;

a connecting groove in matching connection to the vacuum sucker is arranged at one end towards the vacuum sucker, of the host machine shell; and a threaded connection part or a snap-fit connection part is arranged at a periphery of the annular groove body of the vacuum sucker, and is embedded into the connecting groove to achieve connection to the air extraction host machine.

5. The vacuum air extraction device with high practicality and reliability according to claim 4, wherein an air pressure sensor for sensing air pressure is further arranged in the air extraction host machine;

a first gas column communicating with the decompression valve through a pipeline, a second gas column communicating with the air pressure sensor through a pipeline, a third gas column communicating with a vacuum air pump through the first pipeline, and a fourth gas column communicating with the vacuum air pump through the second pipeline are arranged in the host machine shell;

the third gas column and the fourth gas column correspond to the air extraction hole and the drain hole respectively; and a plurality of support columns used for allowing the control circuit board, the vacuum air pump, the decompression valve and the air pressure sensor to be mounted are further integrally formed on an inner side of the host machine shell.

6. The vacuum air extraction device with high practicality and reliability according to claim 4, wherein a seal ring is further attached on an inner side of the connecting groove;

a plurality of spacing holes are formed in the seal ring in a surrounding manner; and spacing columns corresponding to the spacing holes are integrally and convexly formed in the connecting groove.

7. The vacuum air extraction device with high practicality and reliability according to claim 1 wherein an LED lamp panel is further arranged on an inner side towards one end of the vacuum sucker, in the air extraction host machine;

a lower part of the air extraction host machine is arranged in a transparent or semi-transparent light-transmitting structure;

the vacuum air extraction device with high practicality and reliability further comprises a rechargeable battery assembly arranged in the air extraction host machine; and a charging socket is formed in the air extraction host machine.

8. The vacuum air extraction device with high practicality and reliability according to claim 1, wherein the vacuum sucker is in snap-in connection to the air extraction connector; and a socket capable of being inserted in the air extraction connector in a surrounding manner is integrally formed at a lower part of the vacuum sucker.

9. The vacuum air extraction device with high practicality and reliability according to claim 1, wherein the inner convex part is located at a middle position of an inner side of the vacuum sucker.

* * * * *